United States Patent
Pandit et al.

(10) Patent No.: US 7,831,783 B2
(45) Date of Patent: Nov. 9, 2010

(54) EFFECTIVE WEAR-LEVELING AND CONCURRENT RECLAMATION METHOD FOR EMBEDDED LINEAR FLASH FILE SYSTEMS

(75) Inventors: Anil Kumar Pandit, Bangalore (IN); Sridhar Sampath, Hubli (IN)

(73) Assignee: Honeywell International Inc., Morristown, NJ (US)

( * ) Notice: Subject to any disclaimer, the term of this patent is extended or adjusted under 35 U.S.C. 154(b) by 621 days.

(21) Appl. No.: 11/317,467

(22) Filed: Dec. 22, 2005

(65) Prior Publication Data

US 2007/0150689 A1 Jun. 28, 2007

(51) Int. Cl.
*G06F 12/02* (2006.01)
(52) U.S. Cl. ............... 711/159; 711/103; 711/113; 711/133; 711/156; 711/6
(58) Field of Classification Search ............ 711/59, 711/6, 103, 113, 133, 156, 159, 165
See application file for complete search history.

(56) References Cited

U.S. PATENT DOCUMENTS

| | | | |
|---|---|---|---|
| 5,341,339 A | 8/1994 | Wells ............... 365/218 |
| 5,634,050 A | 5/1997 | Krueger et al. | |
| 5,845,313 A | 12/1998 | Estakhri et al. ............. 711/103 |
| 6,000,006 A * | 12/1999 | Bruce et al. ................. 711/103 |
| 6,038,636 A | 3/2000 | Brown, III et al. | |
| 6,473,820 B1 * | 10/2002 | Zhang ........................ 710/240 |
| 6,571,261 B1 | 5/2003 | Wang-Knop et al. ........ 707/206 |
| 7,139,863 B1 * | 11/2006 | Defouw et al. ............. 711/103 |
| 2004/0044837 A1 | 3/2004 | Hasbun et al. | |
| 2007/0061810 A1 * | 3/2007 | Mehaffy et al. ............. 718/104 |

FOREIGN PATENT DOCUMENTS

| | | |
|---|---|---|
| GB | 2 411 746 A | 9/2005 |
| WO | WO 98/14879 | 4/1998 |
| WO | WO 99/56212 | 11/1999 |

OTHER PUBLICATIONS

USByte.com—Flash memory (total of 6 pgs.), Copyright © 1999-2002 USByte.com.
International Search Report for PCT/US2006/048932 dated Oct. 4, 2007.

\* cited by examiner

*Primary Examiner*—Stephen C Elmore
*Assistant Examiner*—Midys Rojas
(74) *Attorney, Agent, or Firm*—Fogg & Powers LLC

(57) ABSTRACT

Reclamation of an Erase Unit of a flash memory is performed concurrently with a file operation on the flash memory by initiating a reclamation operation on the individually erasable portion of the memory, by suspending the reclamation operation for the file operation, by performing the file operation, and by resuming the reclamation operation.

11 Claims, 10 Drawing Sheets

EFFECTIVE WEAR-LEVELING AND CONCURRENT RECLAMATION METHOD FOR EMBEDDED LINEAR FLASH FILE SYSTEMS

TECHNICAL FIELD OF THE INVENTION

The present invention relates to the reclamation of memories such as flash memories.

BACKGROUND OF THE INVENTION

Flash memory (e.g., Electrically-Erasable Programmable Read-Only Memory or "EEPROM") has been used as long-term memory in computers, printers, and other instruments. Flash memory reduces the need for separate magnetic disk drives, which can be bulky, expensive, and subject to breakdown.

A flash memory typically includes a large plurality of floating-gate field effect transistors arranged as memory cells, and also includes circuitry for accessing the cells and for placing the transistors in one of two memory conditions (0 or 1). These transistors retain information even when power is removed, and their memory conditions can be erased electrically while the flash memory is in place.

One disadvantage of flash memory in comparison to other memories such as hard disks is that flash memory must be erased before it can be reprogrammed, while old data on a hard disk can simply be over-written when new information is to be stored thereon. Thus, when a file which is stored in flash memory changes, the changes are not written over the old data but are rather written to one or more new free blocks of the flash memory, and the old data is marked unavailable, invalid, or deleted, such as by changing a bit in a file header or in another control unit stored on the flash memory.

Because flash memory cannot be reprogrammed until it has been erased, valid information that is to be preserved in the flash memory must be rewritten to some other memory area before the area of the flash memory containing the valid information is erased. Otherwise, this valid information will be erased along with the invalid or unavailable information in the flash memory.

Older flash memories had to be erased all at one time (i.e., a portion of older flash memories could not be erased separately from other portions). Thus, with these older flash memories, a spare memory, equal in size to the flash memory, had to be available to store any valid files to be preserved while the flash memory was being erased. This spare memory could be a RAM chip, such as a static RAM or DRAM, or could comprise another flash memory. These valid files were then returned from the spare memory to the flash memory after the flash memory was erased. Accordingly, any space on the flash memory which had been taken up by the unwanted and deleted files is again made available for use.

In later flash memories, a portion of the flash memory could be erased separately from other portions of the flash memory. Accordingly, a particular target unit of the flash memory (i.e., the unit to be erased) is selected based on such criteria as dirtiness and wear leveling. Then, available free space in other blocks of the flash memory is located, and any valid data from the target unit is moved to the available space. When all valid data has been moved to the available free space, the target unit is erased (reclaimed) separately from the other units of the flash memory. This reclamation can be implemented at various times such as when there is insufficient free space to satisfy an allocation request, when the ratio of de-allocated space to block size exceeds a threshold value, when there is a need to defragment the memory, or otherwise.

Conventional flash file systems do not permit file transactions during reclamation. Accordingly, if a reclamation is underway when a power interruption occurs, valuable data could be lost since the time that any power backup is effective is limited and may be exceeded by the time required to finish the reclamation. During the next restart of the file system, the log (journal) has to be parsed and corrections will have to be applied in order to put the file system into a stable state (probably with a data loss).

Furthermore, reclamation in current flash memory file systems is based only on emulating the hard disk on linear flash without considering the rapid and deterministic storage requirements of real-time embedded applications and also without considering flash life because of (a) block device nature emulating the hard disk and (b) in-efficient wear-leveling algorithms.

The present invention provides a concurrent reclamation process that overcomes one or more of these or other problems.

SUMMARY OF THE INVENTION

In accordance with one aspect of the present invention, a method for concurrently reclaiming an individually erasable portion of a memory and performing a file operation on the memory comprises the following: initiating a reclamation operation on the individually erasable portion of the memory; suspending the reclamation operation for the file operation; performing the file operation; and, resuming the reclamation operation.

In accordance with another aspect of the present invention, a method for reclaiming targeted Erase Units of a flash memory comprises the following: identifying the targeted Erase Units based on fitness for reclamation; and, reclaiming the targeted Erase Units even if the targeted Erase Units do not contain dirty Blocks of the flash memory.

In accordance with still another aspect of the present invention, a method of selecting for reclamation an Erase Unit from among a plurality of Erase Units of a flash memory comprises the following: inspecting information of a Master Control Erase Unit; selecting the Erase Unit for reclamation based on the inspected information; and, reclaiming the Erase Unit selected for reclamation even though free Erase Units exist on the flash memory sufficient to support a file operation.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
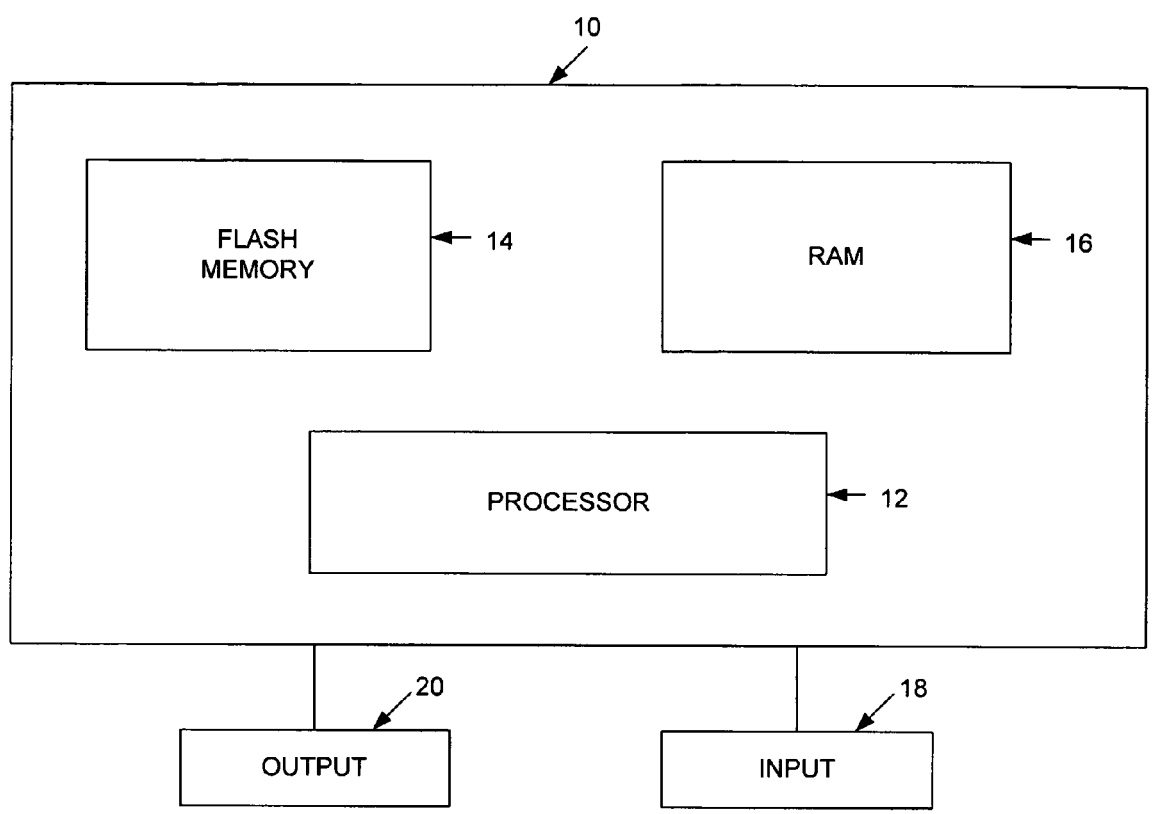
FIG. 1 is a block diagram illustrating an example of an embedded system in which the present invention can be used.

FIG. 1 shows an embedded system 10 which can be a computer, a personal digital assistant, a telephone, a printer, etc. The embedded system 10 includes a processor 12 that interacts with a flash memory 14 and a RAM 16 to implement the functions provided by the embedded system 10.

Additionally, the embedded system 10 includes an input device 18 and an output device 20. The input device 18 may be a keyboard, a keypad, a mouse or other pointer device, a touch screen, and/or any other device suitable for use by a user to provide input to the embedded system 10. The output device 20 may be a printer, a display, and/or any other device suitable for providing output information to the user of the embedded system 10.

A number of definitions are useful to understand at the outset and can be referred to as the present invention is described below.

Block—A linear flash storage device such as the flash memory 14 typically contains a plurality of Erase Units. An Erase Unit is divided into Extents, and an Extent is further divided into Blocks. A Block is the smallest allocation unit of the storage device. The sizes of Extents and Blocks may vary from flash memory to flash memory but typically do not vary within a storage device. The file system of a storage device maintains in the Master Control Erase Unit a free, dirty, or bad state for each Block of the storage device.

Bad Block—A Block in which no write/read operations can be performed.

Dirty Block—A Block containing non-useful (unwanted) information.

Erase Suspend—An erasure of the data in an Erase Unit can be deferred (suspended) for some time while file operations are being performed.

Extent—A contiguous set of Blocks. An Extent usually comprises an even multiple of Blocks. Files are typically allocated at the Extent level, even when only one block is required. This Extent allocation is done to prevent fragmentation and to help in reclamation.

Erase Unit—An Erase Unit is the smallest unit of the flash memory 14 that can be erased at a time. The flash memory 14 may consist of several Erase Units.

Erase Unit Health—The number of times that an Erase Unit has been erased.

Erase Unit Information—For each Erase Unit in the flash memory, certain information, such as Erase Unit Health, and an identification of the Free, Dirty and Bad Blocks of the Erase Unit, needs to be maintained. This information is stored both on the RAM 16 and also within the Master Control Erase Unit of the flash memory 14.

Filemap Block—The meta data of a file stored on the flash memory 14 is stored in a Filemap Block. This meta data includes information about offset within a file, the useful length within the Block, and an identification of the actual Extent and the actual Blocks within the Extent containing file data. The amount of file data contained in a block is called the useful length of the block. The rest of the block is in an erased state and can receive additional data.

Inode—An inode is a block that stores information about a file such as the file name, the file creation time, an file attributes; also, the Inode points to the Filemap block which in turn points to the file data blocks. The file data blocks are the smallest storage units of the flash memory 14.

Incore Inode—For each file that exists on the flash memory 14, there exists an Incore Inode in the RAM 16 that contains information such as file size, file meta data size, Inode Extent and Block number, information on file locks, etc.

Master Block—The Master Block is the first block of the Master Control Erase Unit and contains the file system signature, basic file system properties, the To-Be-Next Master Control Erase Unit.

Master Control Erase Unit—The logical Erase Unit that contains the crucial file system information for all Erase Units of the flash memory. Thus, there is typically only one Master Control Erase Unit per file system partition on the flash memory 14. A Master Control Erase Unit might be thought of as a header that contains information about the Blocks and Extents of the one or more Erase Units associated with the Master Control Erase Unit.

To-Be-Next Master Control Erase Unit—The logical Erase Unit that will act as the Master Control Erase Unit after an original Master Control Erase Unit is reclaimed.

Reclamation—The method by which the useful data blocks are transferred from one Erase Unit (the targeted Erase Unit) as needed to another Erase Unit (a free Erase Unit) so that, mainly, dirty blocks created as result of file overwrite operations and due to deletion of file data can be erased, and so that the flash memory 14 can be wear-leveled. Reclamation is required because, on the flash memory 14, once a bit is toggled from 1 to 0, that bit cannot be changed back to a 1 again without an erase of the whole Erase Unit containing this bit. Also, because the Erase Unit size is so large, the file system of the flash memory 14 divides and operates on Extents and Blocks.

Wear-Leveling—As the flash memory 14 consists of Erase Units, the life of the flash memory 14 depends on effective wear leveling of the Erase Units because the flash memory 14 has a definite life span, typically several million erasures, and once an Erase Unit wears out, no file operations can be performed on that Erase Unit, which severely impairs the file system.

Wear-Leveling Threshold—The maximum difference in erase counts between the Erase Unit having the most erasures and the Erase Unit having the least erasures. If an Erase Unit falls outside this band, the data in this Erase Unit is relocated and the Erase Unit is erased.

As indicated above, the flash memory 14 is divided into a plurality of Erase Units. The number of Erase Units is somewhat arbitrary, but often depends on the size of the flash memory 14.

The starting point of a file system for a flash memory is the Master Control Erase Unit. The Master Control Erase Unit is the logical Erase Unit that contains the file system information for the corresponding Erase Unit(s). The size of the logical Master Control Erase Unit may range from one physical Erase Unit to multiple physical Erase Units depending on the size of the flash memory 14 and the size of the Erase Units. The file system deals with the size of the logical Erase Unit instead of the size of the physical Erase Unit in order to accommodate all crucial file system information within the logical Erase Unit. When a logical Erase Unit comprises several physical Erase Units, the file system manages, during reclamation and erasure, the state of the physical Erase Units in the logical Erase Unit in a way to prevent corruption of the stored data.

At any given time, there is only one MASTER CONTROL ERASE UNIT per file system partition on the flash memory 14. Thus, in the flash memory 14, if there is more than one file system partition, then there will exist one MASTER CONTROL ERASE UNIT per file system partition. If there exists more than one file system partition in the flash memory 14, concurrency of file operations/reclamations is prevented by using a semaphore in the driver layer (media abstraction library).

There is no practical limit to the number of physical erase units that can be covered by a logical Master Control Erase Unit. The number of physical erase units covered by the Master Control Erase Unit (i.e., logical erase unit) depends on the size of the actual physical erase unit, the size of media, and the size of the file system partition.

Figure 2:
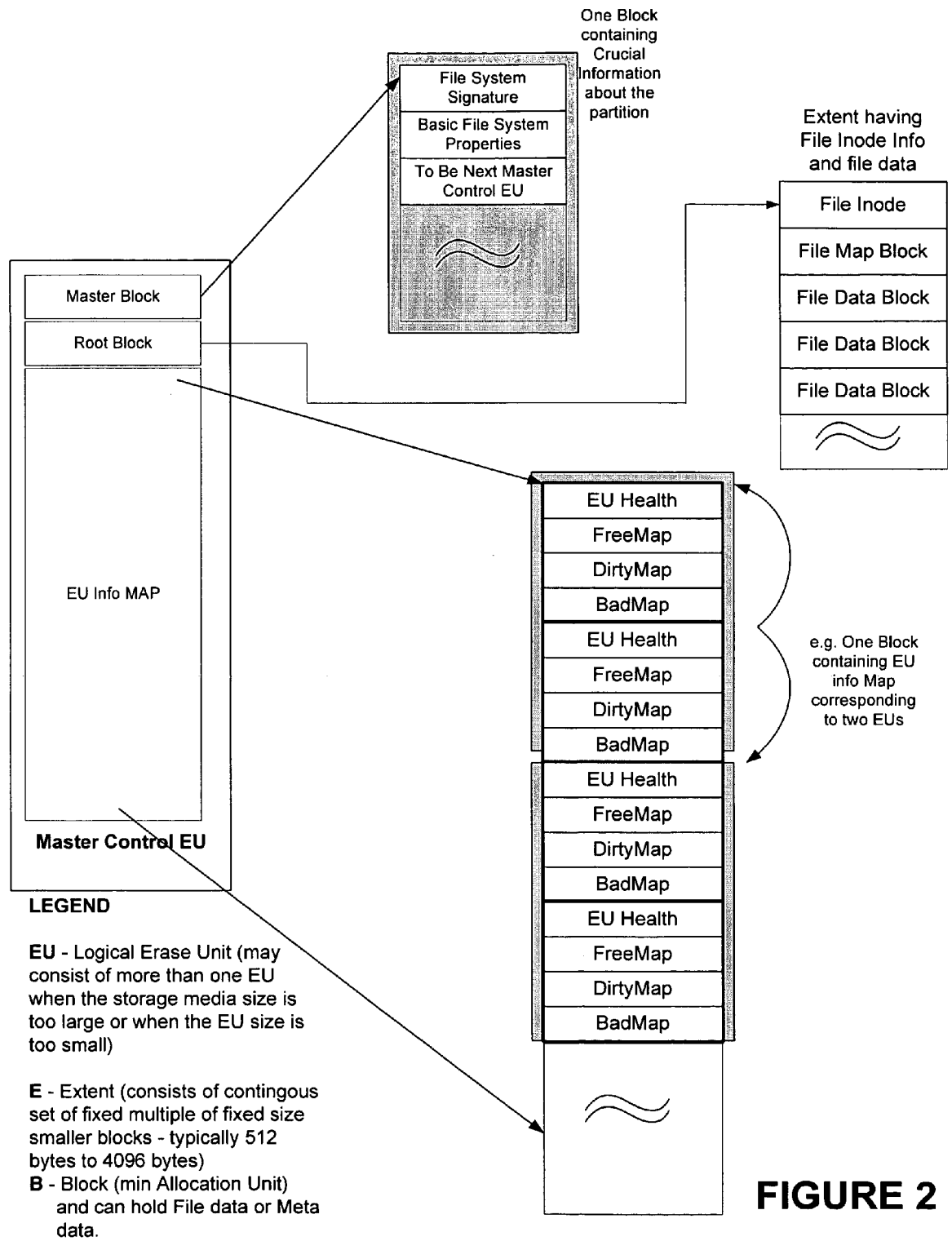
FIG. 2 illustrates an example of a Master Control Erase Unit stored in the flash memory of FIG. 1.

FIG. 2 illustrates an example of a Master Control Erase Unit stored on the flash memory 14. The first block of the Master Control Erase Unit is the Master Block that contains a file system signature, basic file system properties, and a To-Be-Next Master Control Erase Unit.

The file system signature is used to identify whether the file system of the flash memory 14 is formatted and initialized or not.

The properties contained in the basic file system properties block include, for example, partition size, Block size, Extent size, root Inode information, Erase Unit information in terms of Erase Unit Health, free block maps, dirty block maps, bad block maps, etc. Files are allocated at the Extent level.

The To-Be-Next Master Control Erase Unit identifies the new logical Erase Unit that will act as the Master Control Erase Unit after the original Master Control Erase Unit has been reclaimed, i.e., the information stored in the original Master Control Erase Unit has been relocated to the To-Be-Next Master Control Erase Unit and the original Master Control Erase Unit has been erased.

The next Block of the Master Control Erase Unit is the root Block. The root Block contains a pointer to the Inode associated with a file.

The rest of the Master Control Erase Unit contains map information. The map information consists of all meta-data information pertaining to each Erase Unit such as Erase unit number, the health of the Erase Unit, erase count, the free/dirty/bad state of the Blocks in the Erase Unit, etc.

The root directory, the sub-directories, and the files form a meta-data hierarchical structure. The root directory meta-data structures contain pointers to sub-directories and files under the root. The sub-directories meta-data structures in turn contain pointers to their sub-directories and files. The file meta-data structures contain pointers to the file data Blocks.

In the case of directories, each data Block in which file data can be stored contains an Extent Block (EB) entry that points to the Inode of a file/directory.

Figure 3:
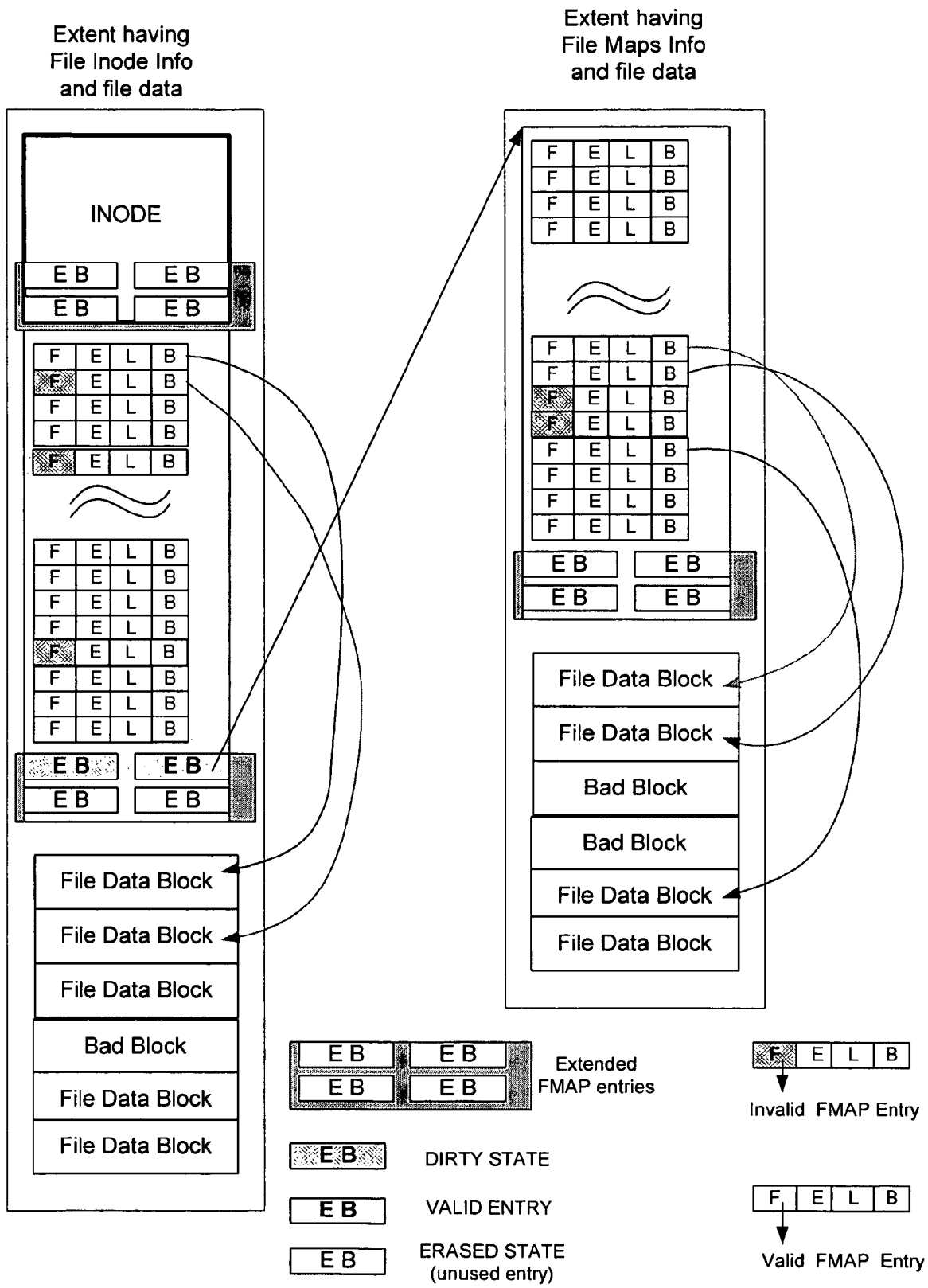
FIG. 3 illustrates an example of an Inode of the Master Control Erase Unit shown in FIG. 2.
Figure 4A:
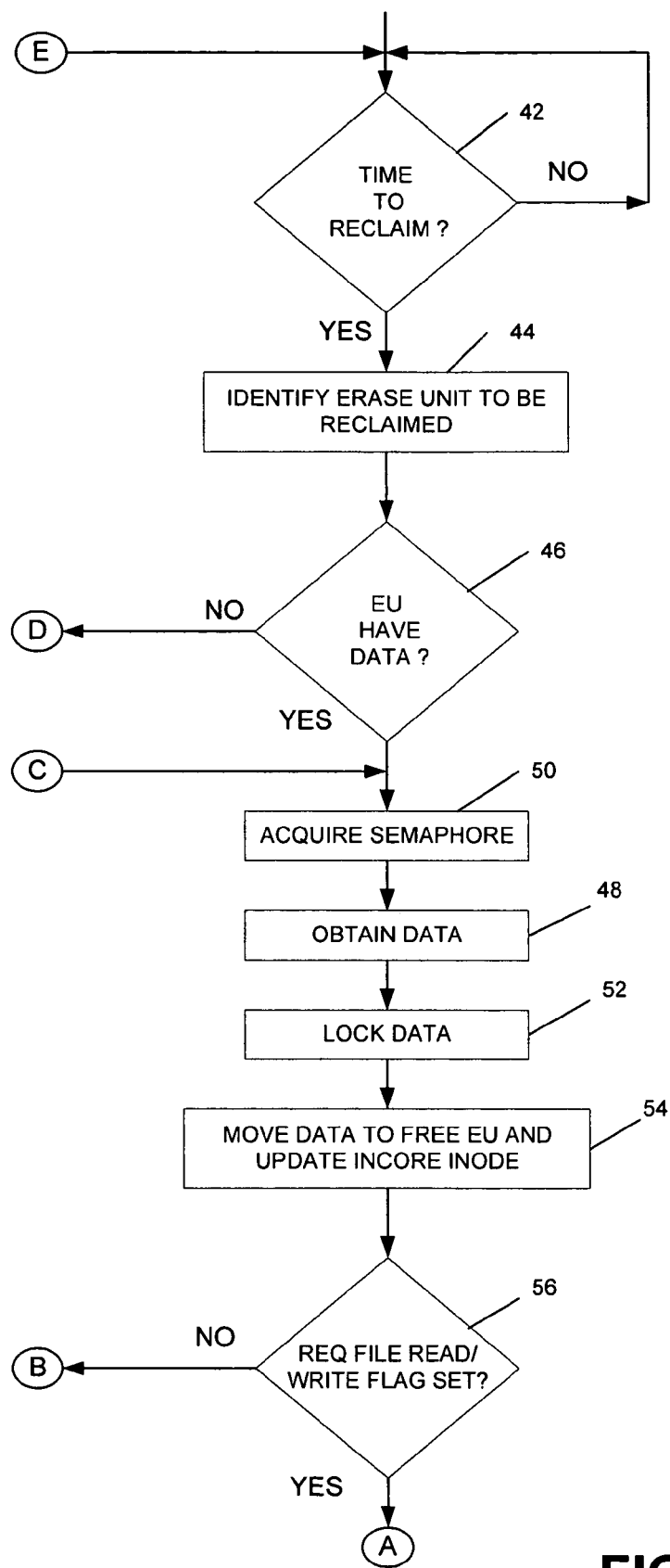
FIGS. 4A-4E is a flow chart illustrative of an example program that can be executed by the device of FIG. 1 in order to implement concurrent reclamation in accordance with an embodiment of the present invention.
Figure 4B:
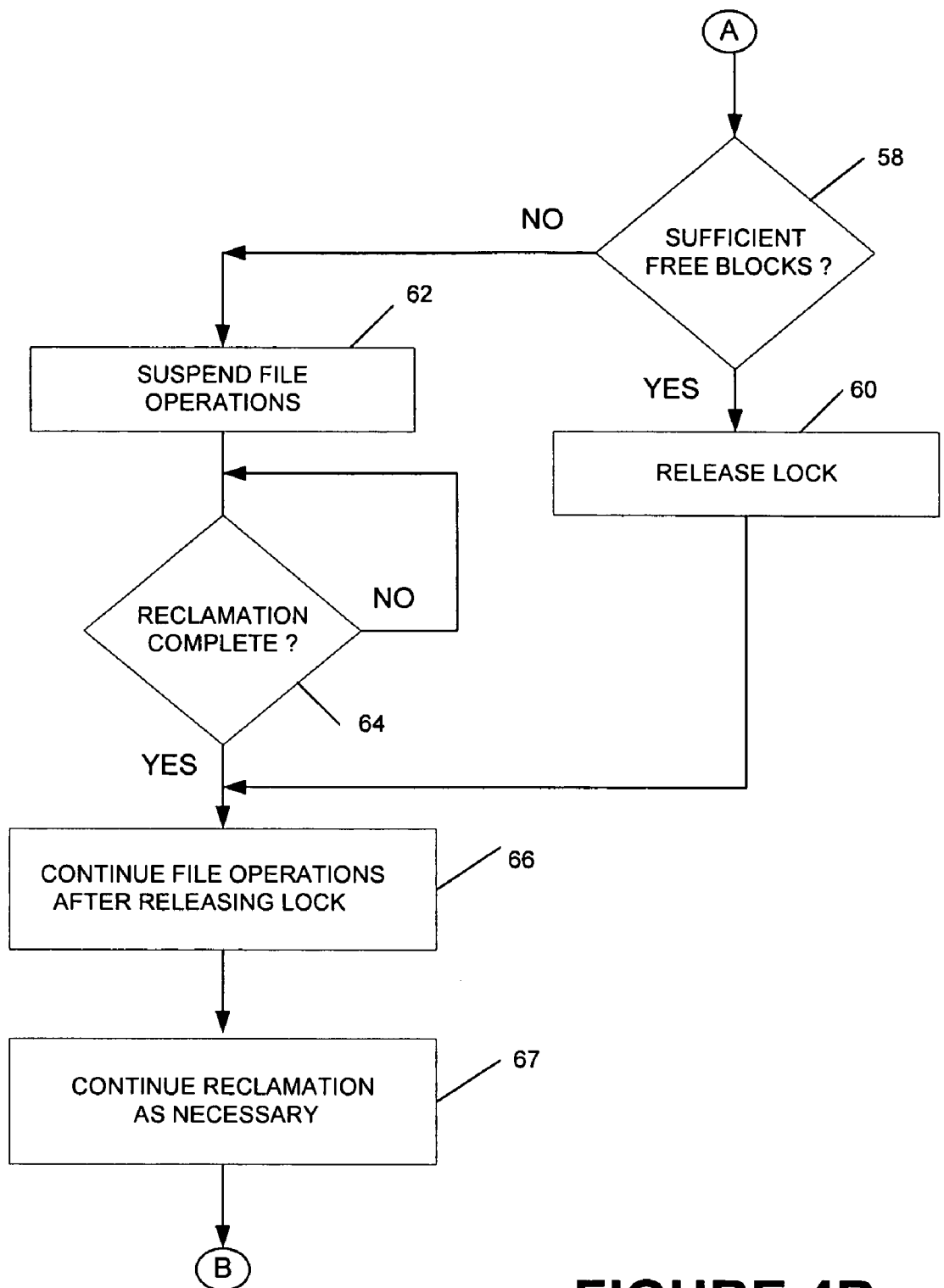
Figure 4C:
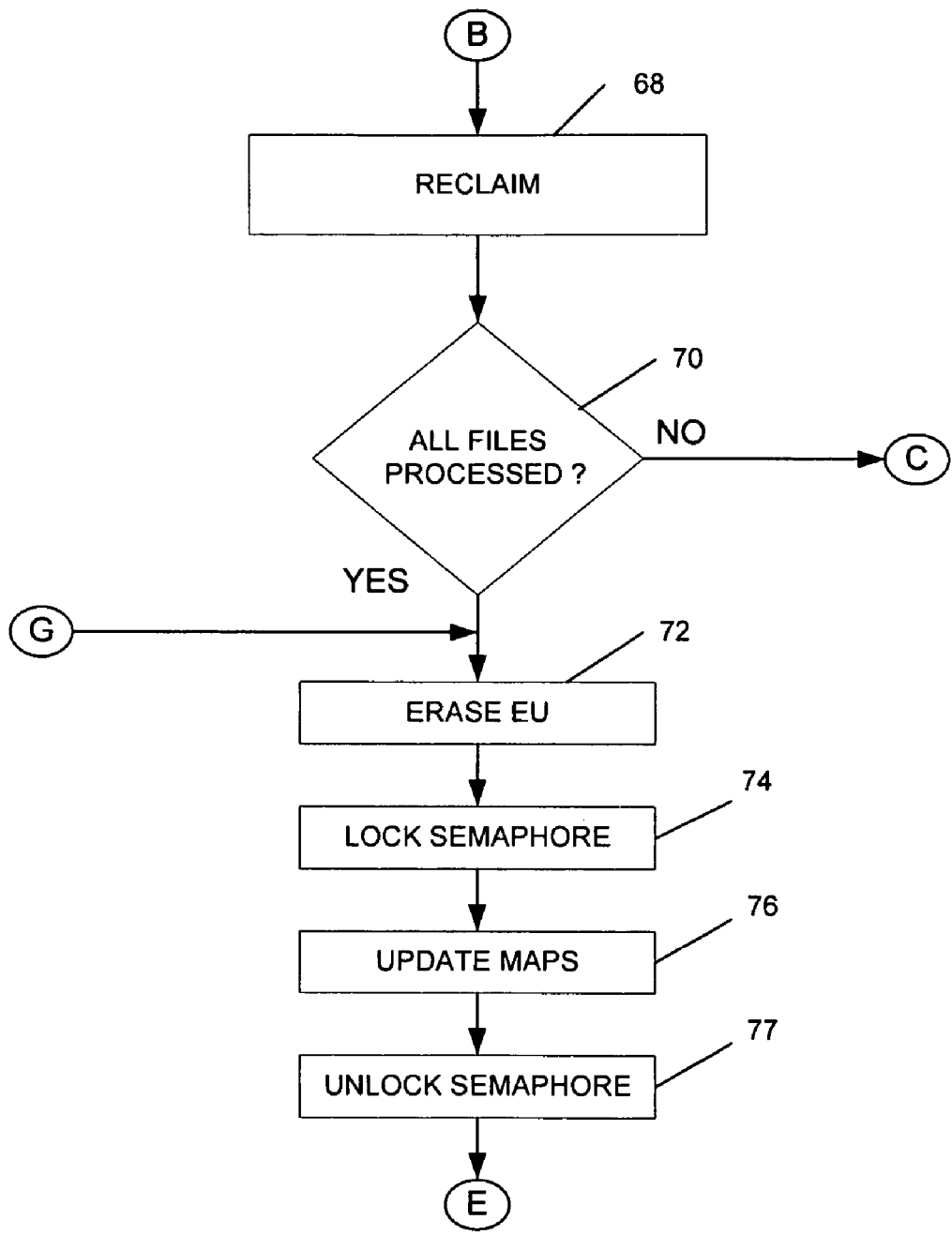
Figure 4D:
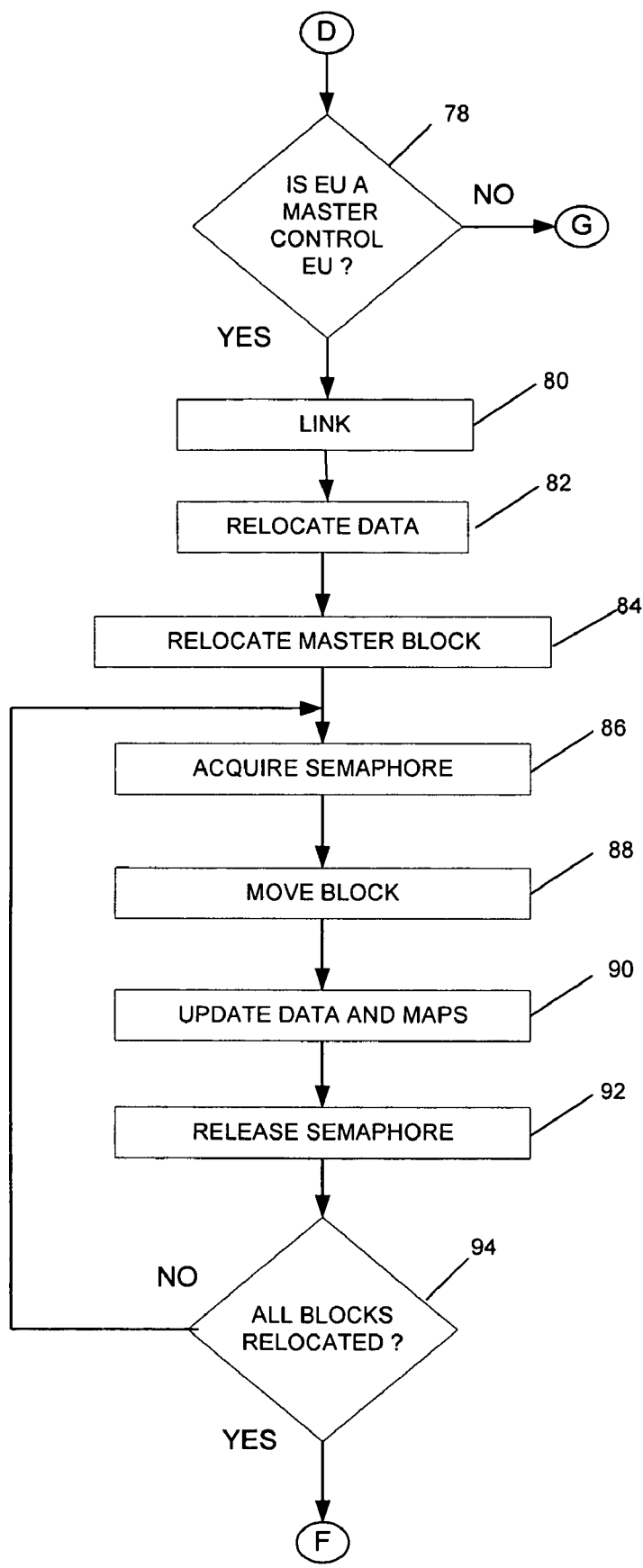
Figure 4E:
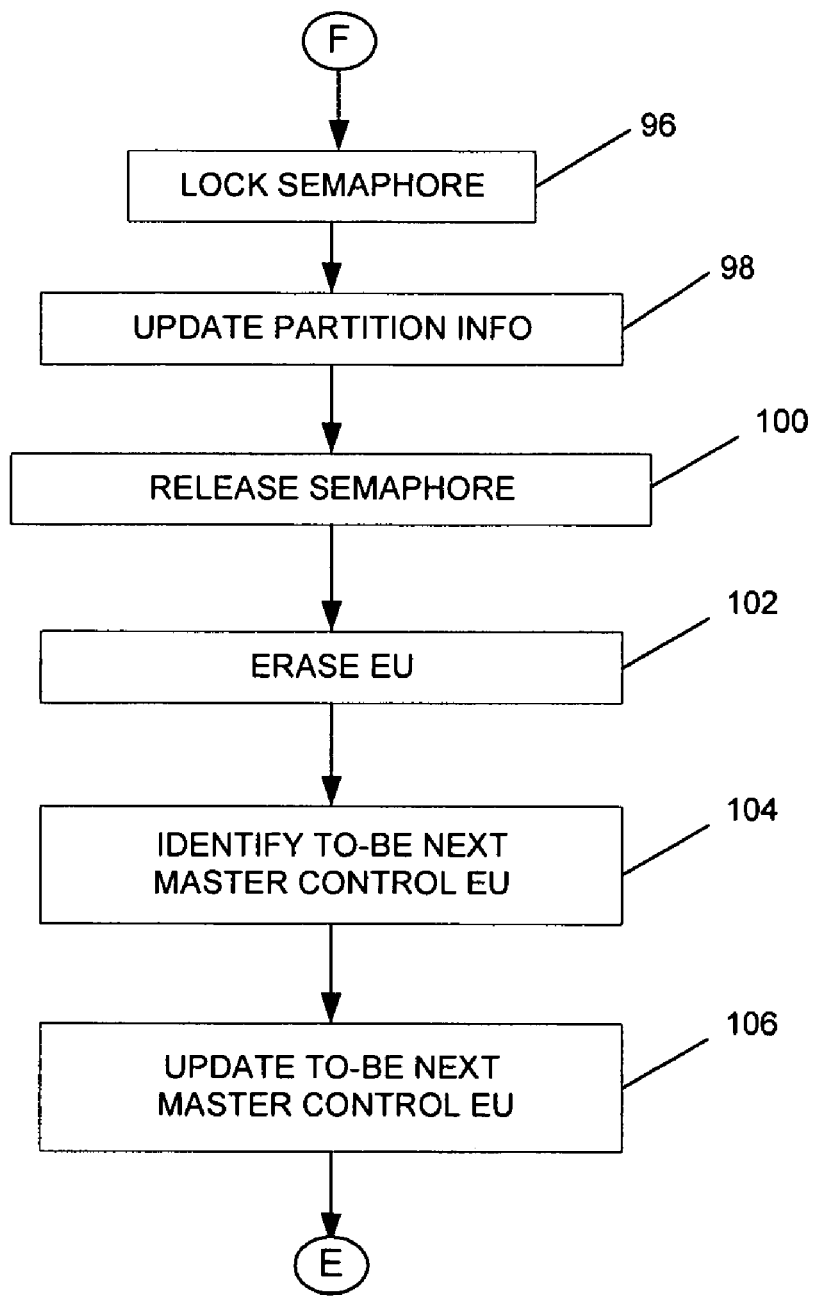

FIG. 3 shows the Inode of FIG. 2 in additional detail. The Inode stores information about a file such as the name of the file, the creation time of the file, and attributes of the file. Also, the Inode points to the Filemap Blocks which in turn points to the file data Blocks. If the file/directory is deleted, the entry is marked as dirty by setting all bits to 0.

Extended Filemap Blocks are used when all the entries in the Filemap Block are used up (with either valid entries or dirty entries). Initially, there is only one Filemap block. Once it becomes full, a new Filemap block is allocated and chained (by using one of four extended file map entries in the previously existing Filemap Block) to the old Filemap block. In other words, the file map is extended and the new Filemap blocks are referred to as extended Filemap blocks. Syntax wise they are similar to the old Filemap block.

In case of regular files, each Filemap entry has an FELB entry, where "F" represents the position of a corresponding file data Block within a file, where "E" represents an Extent number in which the data block is present, where "L" represents the length of useful data in the block, and where "B" points to the corresponding file data Block in the flash memory 14. It is not necessary to have filemap block in each of the extents. In some cases, there may be more than one filemap block in an extent and, in some cases, there might be no filemap block in an extent. The filemap blocks are created and chained only when there is no more room available for storing a filemap entry in the existing filemap block.

In case of a file overwrite operation, a new data Block is obtained, a new Filemap entry corresponding to the position of the new data Block is appended to the Filemap entries, and the new data is written by overlaying the contents from the previously existing Block. Then the previous FELB entry is marked as dirty. In other words, flash memory does not allow overwrites as bit changes. However, the file system for a flash memory allows the user to change (i.e., overwrite) a file's data/contents. Basically, the file system stores the new data in different (i.e., new) blocks of the flash memory and updates the metadata to mark the old data blocks as dirty. This process gives the impression that data is overwritten by the file system to the user, although actually the data is simply stored at a different location on the flash memory.

Since Filemap entries are scattered throughout the Filemap blocks and are interspersed with dirty entries, the file system may be arranged, if desired, to buffer, in the RAM 16, the position of the Filemap entry in the sequence of file positions to provide deterministic performance and at the same time to simplify implementation of the file system. The buffering of a Filemap is done during an open( ) call if it is not already buffered.

Once the Filemap is buffered, a link is established in the Incore Inode stored in the RAM 16. The link is a pointer in the Incore Inode that points to the buffered file map. For each file stored in the flash memory 14, there exists an Incore Inode in the RAM 16 that contains such information as the size of the file, the size of the meta data for the file, the Inode Extent and Block number for the file, information on file blocks that store the file, etc. When no file descriptor references the file (during the close of a file, the number of users of the file is being tracked), the buffers are released to efficiently use the RAM 16 as there might be several files existing on the flash memory. (A file descriptor, from the user point of view, is a handle that is used to reference a file. Whenever a user opens a file, the user gets a file descriptor that points to the file. The user uses this file descriptor to read/write to that file. When the user closes the file, the file descriptor is freed.)

Concurrent reclamation as used herein does not necessarily mean that file write/read operations and reclamation happen at the same instance in time. Indeed, it is difficult for file write/read operations and reclamation to occur at the same instance in time because of restrictions typically imposed by the flash memory 14 itself. The mode of the flash memory 14 cannot be altered for the quantum of the work being done. In order to overcome this characteristic of flash memory, the file system may be arranged to operate on smaller chunks of bytes organized as a Block. Because there is more than one task/thread running concurrently, the task/threads can share the CPU and effectively make it appear that operations are concurrent so as to reduce latency time.

The process of concurrent reclamation of the flash memory 14 is disclosed below in relation to the flow charts of FIGS. 4A-4E, 5, and 6

1) As shown by 42 of the program 40 illustrated by way of the flow chart in FIGS. 4A-4E, when it is time to initiate a reclamation cycle, the Erase Units that the wear-leveling algorithm determines are fit for reclamation are identified at 44.

A) According to an embodiment of the present invention, an Erase Unit is reclaimed as and when it is found fit for reclamation such that reclamation of Erase Units is not delayed until there are few or no free Erase Units left.

B) Reclamation of an Erase Unit may be triggered by the wear-leveling algorithm even though the Erase Unit may not contain dirty blocks. The wear-leveling algorithm is discussed in more detail below in connection with FIGS. 5 and 6.

2) If the Erase Unit being reclaimed (i.e., the targeted Erase Unit) corresponds to an Erase Unit containing useful (wanted) file data as determined at 46 (for example, by inspecting the Master Control Erase Unit for meta-data indicating that there are Blocks in the targeted Erase Unit which contain file data and which are not marked as dirty), the useful file data is relocated from an Erase Unit targeted for reclamation according to the following:

A) At 48, the Erase Unit Information contained in the Master Control Erase Unit corresponding to the targeted Erase Unit (i.e., the Erase Unit targeted for reclamation) is used to obtain the file data located in the targeted Erase Unit. Because files are allocated at the Extent level and not at the Block level, the search for the files in the targeted Erase Unit is much faster than if files were stored at the Block level.

B) At 50, the semaphore/mutex corresponding to the files in the targeted Erase Unit is acquired, and the files are locked at 52 by setting a suitable variable in the Incore Inode. A mutex is a program object that allows multiple threads to share the same resource. Any thread that needs the resource must lock the mutex from other threads while it is using the resource. The mutex is unlocked when it is no longer needed or the thread is terminated. The difference between a mutex and a semaphore is that a mutex is owned by the thread which locked it (that is, only the process which locked the mutex can unlock it), whereas a semaphore can be changed by another thread or process.

C) At 54, the file data Block or meta-data Block corresponding to the locked file is moved from the targeted Erase Unit to a free Erase Unit where space is available to hold the data. An Erase Unit that is free can be found by inspecting the meta-data of the Master Control Erase Unit for an Erase Unit having available space. At 56, a check is made to determine if some client or user wants to perform a file operation on the file being relocated by checking a variable reqFileReadWrite that is maintained in the corresponding Incore Inode. The variable reqFileReadWrite is set whenever a user invokes a read( ) or write( ) call. Only the file blocks that are present in the targeted Erase Unit are subject to relocation to another Erase Unit. In this process of relocation, the Filemap entry corresponding to the file in the targeted Erase Unit is marked as dirty and the new Filemap entry corresponding to the file in the free Erase Unit is suitably appended with meta-data relevant to the moved file data.

D) If the Inode itself is present in the Erase Unit that is being reclaimed, then relevant information in the Incore Inode is updated at 54 after relocation of the Inode and before releasing the file lock in Incore Inode. This relevant information includes Inode Extent and Block number of the new Extent and Block containing the Inode.

E) Also, if a Filemap Block of a file exists in the targeted Erase Unit, the useful meta file data (Filemap entries) are relocated/appended at 54 to the Filemap Block in a free Erase Unit. In this process, the link from the parent Filemap Block is updated to point to the Filemap Block following the Filemap Block being relocated. In other words, the extended file map entries in the file map block contain Extent Block (EB) entries that are updated by using the new entry and by discarding the old entry (e.g., if the first entry of four possible extended Filemap entries was used to link to the next Filemap block, during relocation of the child Filemap block, the first entry is marked as dirty and a second entry is now used to point to the Filemap block that is created or existing in the Erase Unit that is not targeted for reclamation.

F) If the variable reqFileReadWrite is set as determined at 56, and if there are sufficient pre-determined free Blocks available in the flash memory 14 to support performance of the file operation as determined at 58, the reclamation thread releases the file lock at 60 to allow the file operation to be completed.

G) If the variable reqFileReadwrite is set as determined at 56, but sufficient pre-determined free Blocks are not available in the flash memory 14 as determined at 58, the file operation is suspended at 62 until the reclamation completes. Once the reclamation of the Erase Unit finishes as determined at 64, or after lock is released at 60, the file operation continues at 66 from the place where it was stopped. (Ideally, by properly balancing the allocation of resources (CPU time, priority, etc.) for the reclamation thread, there should always be sufficient free Blocks in a properly configured system to permit the file operation to proceed before finishing the reclamation. The reclamation is then continued as necessary at 67.

H) If the variable reqFileReadWrite is not set as determined at 56, the reclamation thread at 68 continues to relocate the file data/meta-data Blocks one after another until all Blocks of the file in the target Erase Unit have been relocated to the free Erase Unit.

I) At 70, steps B) through H) (50-70) are repeated for all files that use Blocks in the targeted Erase Unit.

J) Once all file blocks have been re-located from the targeted Erase Unit, the Erase Unit is erased at 72. The erasure of the targeted Erase Unit will not lock the semaphore.

K) After the erasure of the targeted Erase Unit, the semaphore for the corresponding file system partition is locked at 74, and the data in the free, dirty, bad Block maps is updated at 76 for the new state of the reclaimed Erase Unit. Only the Erase Unit health and bad block information is received from the previous Erase Unit map block. The free map and the dirty map information is received from the previous Erase Unit map block because all blocks are now free. Also, the Erase Unit health is incremented dues to the erasure operation being performed as part of reclamation. A power failure during erasure does not create any problems as the new maps are added before marking the old Erase Unit Information data in the Master Control Erase Unit as dirty.

3) If the Erase Unit being relocated corresponds to an Erase Unit that does not contain useful file data as determined at 46, and if the Erase Unit being relocated is a Master Control Erase Unit that consists of a file system signature, basic file system properties such as partition size, Block size, Extent size, root Inode information, Erase Unit Information in terms of Erase Unit health, free dirty maps, bad block maps, etc. as determined at 78, the relocation of the useful data from the old Master Control Erase Unit involves the following.

A) The targeted Master Control Erase Unit is linked at 80 to the To-Be-Next Master Control Erase Unit in the To-Be-Next Master Control Erase Unit entry present in the Master Block of the targeted Master Control Erase Unit to be relocated.

i) The Erase Unit related data in the targeted Master Control Erase Unit (which includes free map, dirty map, bad Block maps, Erase Unit health map) is relocated on the flash memory 14 at 82. The Erase Unit related information on the flash memory 14 is defined as follows:

```
struct stEuInfoOnFlash
{
    DWORD dEuNo;
    DWORD dEUHealth;
    BYTE   bEuMap [MAP_SIZE];
}
``` where MAP_SIZE is a macro that is assigned with a value to represent free Block map, dirty Block map, and bad Block map for the Erase Unit being considered. This value changes based on the Erase Unit size, Extent size, and Block size.

ii) The Master Block that contains the file system signature and basic file system properties (such as Block size, Extent size, partition size, To-Be-Next Master Control Erase Unit, etc.) is relocated at 84.

B) The semaphore is acquired at 86, one block corresponding to the Erase Unit related data or map as mentioned above is moved at 88 from the targeted Master Control Erase Unit to the To-Be-Next Master Control Erase Unit, the Erase Unit related data and maps in the To-Be-Next Master Control Erase Unit are updated at 90 such that any updates due to file operations will involve changes to the relocated blocks in the To-Be-Next Master Control Erase Unit, and the semaphore is then released 92. Any Blocks that do not contain valid Erase Unit Information data are not relocated.

C) The operations in step B) (86-94) are repeated until all Blocks in the old Master Control Erase Unit have been re-located.

D) The semaphore acquired at 86 is locked at 96, the partition information structure is updated at 98 to change the targeted Master Control Erase Unit to the "To-Be-Next Master Control Erase Unit, and the semaphore is released 100. For each partition supported by the file system, there exists a structure in the RAM 16 to hold such partition information as partition ID, physical address of the Flash memory, partition size, Erase unit size, extent size, block size, Master Control EU, To-Be-Master Control EU, etc.

E) The Erase Unit corresponding to the targeted Master Control Erase Unit is erased, and the free, dirty, and Bad maps and the Erase Unit health of the Master Control Erase Unit are updated appropriately at 102.

F) A free Erase Unit is identified to act as a new To-Be-Next Master Control Erase Unit as decided by the wear-leveling algorithm, and the partition information structure variable is updated at 104.

G) The free map corresponding to the new To-Be-Next Master Control Erase Unit is updated at 106 to mark all Blocks within the Erase Unit as used to prevent allocation of the Blocks from To-Be-Next Master Control Erase Unit for storing the file data.

4) If the Erase Unit being reclaimed does not contain useful file data as determined at 46, and if the Erase Unit being relocated is not a Master Control Erase Unit as determined at 78, then the Erase Unit is erased at 72, the semaphore for this partition is locked at 74, and the data in the free, dirty, bad Block maps for this Erase Unit is updated at 76.

With this approach, file updates can occur concurrently with reclamation and, hence, during a power loss signal, the file data can be written in parallel with reclamation process within the limited battery backup time.

Figure 5:
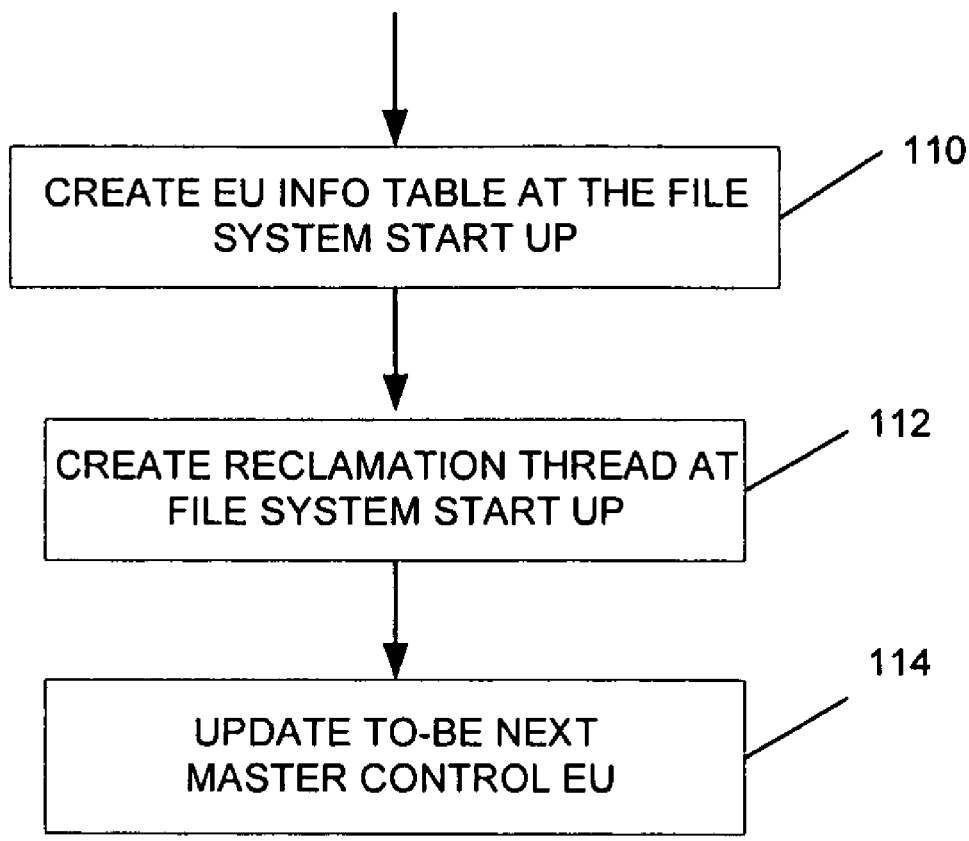
FIG. 5 is a flow chart illustrating one way to initiate reclamation.
Figure 6:
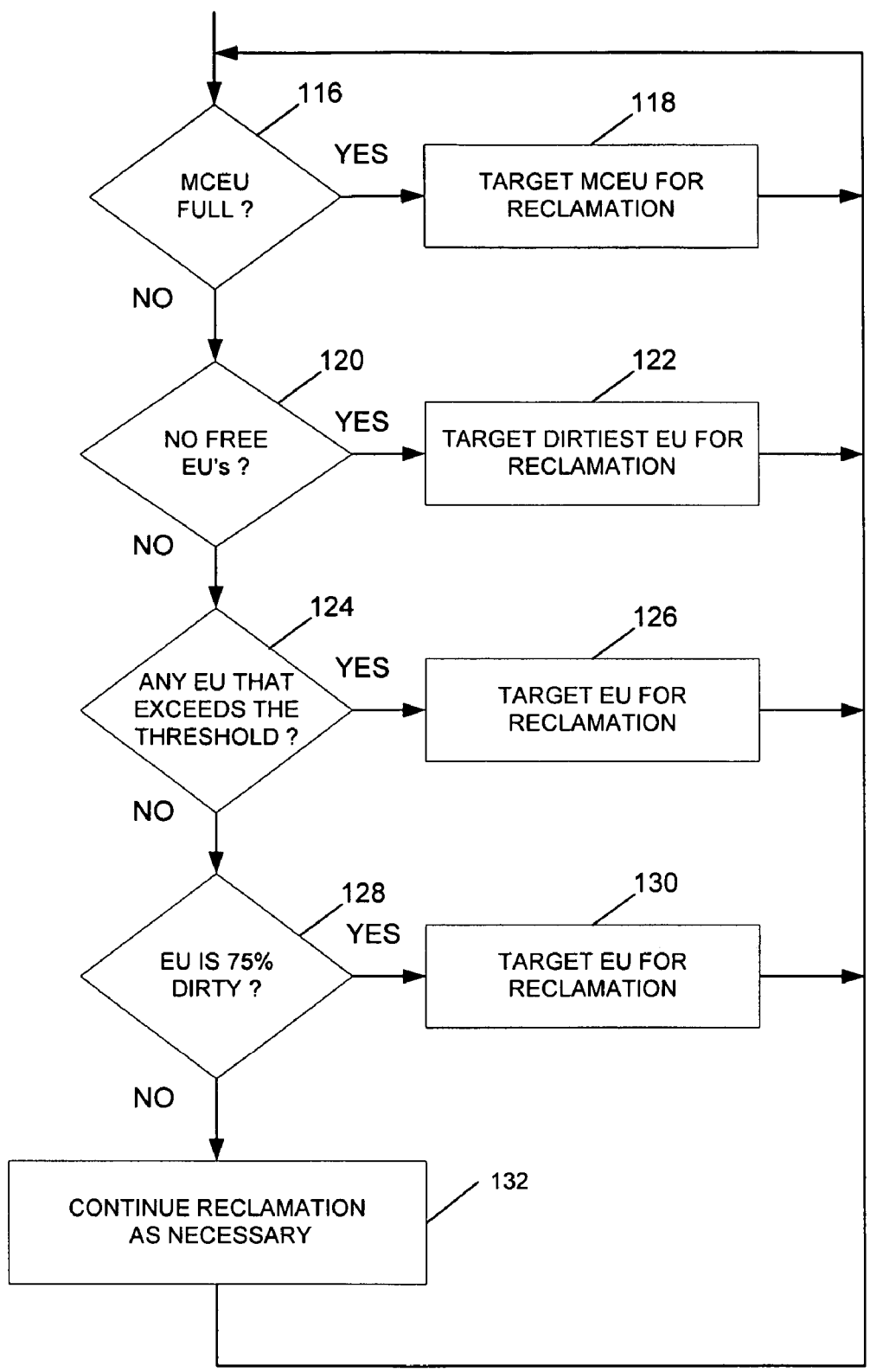
FIG. 6 is a flow chart expanding on the flow chart of FIG. 5.

5) The wear-leveling algorithm of FIGS. 5 and 6 is implemented as follows in order to determine at 42 that it is time to initiate a reclamation cycle and to identify the Erase Units for reclamation at 44:

A) At 110, an Erase Unit Information table is created in the RAM 16 that has records in the following format:

```
struct EU_INFO
{
    DWORD dEuNo;
    DWORD dEuHealth;
    DWORD dNoOf FreeBlocks;
    DWORD dNoOfDirtyBlocks;
    DWORD dNoOfBadBlocks;
    DWORD pMapStart;
    struct stIncoreInode pFileIncores [x];
    // NOTE: Based on the Block, Extent and
    // Erase Unit size, there are 'x' number of
    // files that could potentially be present
    // in an Erase Unit.
}
```

B) The Erase Unit Information table is created at 110 at file system startup by scanning the Erase Unit related data from the flash memory 14.

C) A reclamation thread is created at 112 at start up to perform the reclamation and wear-leveling routines.

D) The reclamation thread created at 112 maintains a list of Erase Units that are totally unused (free Erase Units) and also list of possible target Erase Units (i.e., Erase Units that are probable candidates for reclamation). This list is put together by scanning the Erase Unit Information table based on the fields of Erase Unit Information structure for all Erase Units.

E) The probable Erase Units for reclamation are chosen at 114 based on the following criteria:

i) If the Master Control Erase Unit is full as determined at 116 of FIG. 6, the Master Control Erase Unit is targeted for reclamation at 118. The size of Master Control Erase Unit is set to a multiple of the Erase Units that is large enough to at least accommodate twice the space required for the initial Erase Unit related information so that, by the time all of the flash memory 14 is used once, the Master Control Block turn for reclamation also comes up thus maintaining the wear-leveling of the flash memory 14.

ii) If there are no free Erase Units in the free Erase Unit pool as determined at 120, then the dirtiest Erase Unit is targeted for reclamation at 122. Dirtiness is determined as a percentage of the Blocks in an Erase Unit that contain non-useful (unwanted) data.

iii) If there are free Erase Units in the free Erase Unit pool as determined at 120, and an Erase Unit has exceeded the Wear-Leveling Threshold as determined at 124, this Erase Unit is selected at 126 for reclamation in order to do the wear-leveling. In this case, the most worn Erase Unit from the free Erase Unit pool is selected to receive the data transferred from the Erase Unit being reclaimed.

iv) If there are any Erase Units that are more than 75% dirty as determined at 128, one of these Erase Units containing the maximum dirty blocks is targeted for reclamation at 130.

F) Additionally the reclamation/wear-leveling thread performs at 132 the following house keeping task when there are no Erase Units to be reclaimed: The file map Blocks are cleared of dirty entries when the file meta data to actual file size exceeds the preset ratio. In actual process when file Erase Units are reclaimed, the file map Blocks in the Erase Unit being reclaimed are cleared of dirty entries and only useful file map entries are relocated into the newer file map Blocks. The Erase Unit Information data in RAM and in the flash memory 14 are always in-sync with the reclamation and file operations.

Conventional file systems of flash media do not include concurrent reclamation to support file operations while reclamation of an Erase Unit is being performed (i.e., file operations are not permitted until the reclamation of the entire Erase Unit is finished). This problem leads to latency.

The failure of conventional file systems to permit file transactions during reclamation is highly undesirable in embedded file systems as there is a limited power backup time within which the file transactions can be completed and stored before the file system is shut down. If the file transactions are not completed before shut down, data loss occurs. If a power failure occurs during reclamation, the performance of the system could by adversely affected because, during the next restart, the log (journal) has to be parsed and the corrections have to be applied to get the file system into a stable state (probably with a loss of data). Also, reclamation is performed in conventional file systems with only one objective, i.e., emulating a block device such as a hard disk. Therefore, conventional file systems do not meet the rapid and deterministic storage requirements in embedded systems.

A large Erase Unit size implies that a long time is required to erase it. All the reads and writes to the media are stopped during erase time in conventional file systems. Typically, the Erase Unit size varies from 32 KB to 128 KB, and the erase time ranges from 1 second to 2 seconds. In case of real time embedded systems, this large delay before a read or write operation can be performed is unacceptable. Apart from this, the Erase Unit might consist of valid data that needs to be relocated before the Erase Unit is erased, which adds to the overhead of erasure. Moreover, the Erase Suspend feature supported by some flash memories is not usable because of the sequential implementation of the reclamation. In the worst case, this involves relocating a whole Erase Unit worth of data, which typically takes about 1 second for an Erase Unit size of 64 KB and increases with the increase in the Erase Unit size.

Therefore, a need exists for the present invention that allows data to be written to the flash memory 14 in a deterministic and efficient manner by implementing concurrent reclamation to perform relocation of Blocks in smaller chunks due the larger time required for reclamation of a complete Erase Unit.

The present invention of concurrent reclamation is highly desirable in embedded real-time systems. Accordingly, reclamation does not block file operations from being performed when the reclamation is in progress, thereby reducing the latency time for such file operations as read( ), write( ), etc. The present invention makes space for file storage operations without involving reclamation overheads at the critical moment when the free space is needed for file storage purposes. At the same time, the flash memory 14 is utilized uniformly with all Erase Units being within the Wear-Leveling Threshold band. This approach also ensures that the Erase Unit Health information is not lost. This method involves minimum overhead for wear-leveling the flash memory 14 as the static data is relocated once in 'n' passes through the memory device (where 'n' is the Wear-Leveling Threshold) instead of being relocated during every pass through the flash memory 14.

Certain modifications of the present invention have been discussed above. Other modifications of the present invention will occur to those practicing in the art of the present invention. For example, the present invention has been described above in relation to flash memory devices. However, although the present invention is particularly beneficial for flash memories, the present invention is applicable to other memories such as linear flash devices (NAND and NOR technology), EEPROMs, etc.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method for reclaiming targeted Erase Units from a plurality of erase units of a flash memory comprising:

when there are free erase units in the plurality of erase units, identifying the targeted Erase Units based on the number of erasures of an Erase Unit and a wear-leveling threshold, the targeted Erase Units having a number of erasures that exceed the wear-leveling threshold, wherein the wear-leveling threshold is a maximum difference in the number of erasures between the Erase Unit having the most erasures and the Erase Unit having the least erasures; and reclaiming the targeted Erase Units even if the targeted Erase Units do not contain dirty Blocks of the flash memory.

2. The method of claim 1 wherein the reclaiming of the targeted Erase Units comprises;

a) locating files in one of the targeted Erase Units on an Extent by Extent basis by use of Erase Unit Information contained in a Master Control Erase Unit;

b) acquiring at least one of a semaphore and a mutex and locking a file containing the file data by setting a variable in an Incore Inode stored on a RAM;

c) moving one file block from the one targeted Erase Unit to a free Erase Unit and determining if a file operation on the file is to be performed by checking a reqFileReadWrite variable in the Incore Inode;

d) if an Inode is present in the one targeted Erase Unit, updating the Incore Inode after relocation of the Inode before releasing a file lock in the Incore Inode;

e) if the variable reqFileReadWrite is set, releasing the file lock to allow the file operation to be performed provided there are sufficient free Blocks available in the flash memory;

f) if the variable reqFileReadWrite is set and if there is insufficient free Block on the flash memory, suspending the file operation until the reclamation is finished;

g) if the variable reqFileReadWrite is not set, continuing the relocation of the file blocks one after another until all blocks of the file in the one targeted Erase Unit have been relocated to the free Erase Unit;

h) repeating b) to e) for all files in the one targeted Erase Unit;

i) when all file blocks have been re-located from the one targeted Erase Unit, erasing the one targeted Erase Unit; and, j) after the erasure, locking the at least one of a semaphore and a mutex and updating free, dirty, and bad block map data for the new state of the one targeted Erase Unit.

3. The method of claim 1 wherein the reclaiming of the targeted Erase Units comprises:

a) locating a Master Control Erase Unit targeted for reclamation;

b) relocating Erase Unit related data in the targeted Master Control Erase Unit after linking the targeted Master Control Erase Unit to a To-B-Next Master Control Erase Unit, wherein the relocated Erase Unit related data includes free, dirty, and bad block maps, and an Erase Unit Health map on the flash memory, wherein the relocating of Erase Unit related data includes relocating a Master Block of the targeted Master Control Erase Unit, and wherein the Master Block contains file system information;

c) acquiring a semaphore, moving one block corresponding to the Erase Unit related data from the target Master Control Erase Unit to the To-Be-Next Master Control Erase Unit, updating the Erase Unit related data in the Master Control Erase Unit so that any updates due to file operations involve changes to the relocated Blocks in the To-Be-Next Master Control Erase Unit, and releasing the semaphore;

d) repeating c) until all Blocks have been relocated;

e) locking the semaphore, updating partition information to change the Master Control Erase Unit from the targeted Master Control Erase Unit to the To-Be-Next Master Control Erase Unit, and releasing the semaphore;

f) erasing the targeted Master Control Erase Unit and updating free, dirty, Erase Unit Health, and bad maps appropriately;

g) identifying a free Erase Unit to act as the To-Be-Next Master Control Erase Unit and updating the partition information for the new To-Be-Next Master Control Erase Unit; and, h) updating the free map corresponding to the To-Be-Next Master Control Erase Unit to mark all Blocks within the To-Be-Next Master Control Erase Unit to mark all Blocks within the To-Be-Next Master Control Erase Unite as used to prevent storing file data in the blocks of the to-be-next Master Control Erase Unit.

4. The method of claim 3 wherein the reclaiming of the targeted Erase Units comprises:

a) locating files in one of the targeted Erase Units to an Extent by Extent basis by use of Erase Unit Information contained in a Master Control Erase Unit;

b) acquiring at least one of a semaphore and a mutex and locking a file containing the file data by setting a variable in an Incore Inode stored in a RAM;

c) moving one file Block from the one targeted Erase Unit to a free Erase Unit and determining if a file operation on the file is to be performed by checking a reqFileReadWrite variable in the Incore Inode;

d) if an Inode is present in the one targeted Erase Unit, updating the Incore Inode after relocation of the Inode before releasing a file lock in the Incore Inode;

e) if the variable reqRileReadWrite is set, releasing the file lock to allow the file operation to be performed provided there are sufficient free Blocks available in the flash memory;

f) if the variable reqFileReadWrite is set and if there is insufficient free Blocks on the flash memory, suspending the file operation until the reclamation is finished;

g) if the variable reqFileReadWrite is not set, continuing the relocation of the file blocks one after another until all blocks of the file in the one targeted Erase Unit have been relocated to the free Erase Unit;

h) repeating b) to e) for all files in the one targeted Erase Unit;

i) when all file blocks have been re-located from the one targeted Erase Unit, erasing the one targeted Erase Unit; and, j) after the erasure, locking the at least one of a semaphore and a mutex and updating free, dirty, and bad block map data for the new state of the one targeted Erase Unit.

5. The method of claim 1 wherein the identifying of the targeted Erase Units comprises:

creating an Erase Unit Information table in a RAM, wherein the Erase Unit Information table is created at file system startup by scanning Erase Unit related data on the flash memory;

creating a reclamation thread at the startup, wherein the reclamation thread maintains a list of Erase Units that are totally unused (free Erase Units) and also a list of Erase Units that are probable candidates for reclamation by scanning the Erase Unit Information table;

targeting a Master Control erase Unit for reclamation if the Master Control Erase Unit is full;

targeting a dirtiest Erase Unit for reclamation if there are no free Erase Units;

targeting a most worn Erase Unit for reclamation if there are free Erase Units and the most worn Erase Unit has exceeded a threshold of minimum to maximum erasures; and, targeting a dirty Erase Unit for reclamation if the dirty Erase Unit is more than 75% dirty.

6. The method of claim 5 wherein the reclaiming of the targeted Erase units comprises:

a) locating files in one of the targeted Erase Units on an Extent by Extent basis by use of Erase Unit Information contained in a Master Control Erase Unit;

b) acquiring at least one of a semaphore and a mutex and locking a file containing the file data by setting a variable in an Incore Inode stored in the RAM;

c) moving one file block from a targeted Erase Unit to a free Erase Unit and determining if a file operation on the file is to be performed by checking a reqFileReadWrite variable in the Incore Inode;

d) if an Inode is present in the one targeted Erase Unit, updating the Incore Inode after relocation of the Inode before releasing a file lock in the Incore Inode;

e) if the variable reqFileReadWrite is set, releasing the file lock to allow the file operation to be performed provided there are sufficient free Blocks available in the flash memory;

f) if the variable reqFileReadWrite is set and if there is insufficient free Blocks on the flash memory, suspending the file operation until the reclamation is finished;

g) if the variable reqFileReadWrite is not set, continuing the relocation of the file blocks on after another until all block of the file in the one targeted Erase Unite have been relocated to the free Erase Unit;

h) repeating b) to e) for all files in the one targeted Erase Unit;

i) when all file blocks have been re-located from the one targeted Erase Unite, erasing the one targeted Erase Unit, and, j) after the erasure, locking the at least one of a semaphore and a mutex and updating free, dirty, and bad block map data for the new state of the one targeted Erase Unit.

7. The method of claim 5 wherein the reclaiming of the targeted Erase Units comprises:

a) locating a Master Control Erase Unit targeted for reclamation;

b) relocating Erase Unit related data in the targeted Master Control Erase Unit after linking the targeted Master Control Erase Unit to a To-Be-Next Master Control Erase Unit, wherein the relocated Erase Unit related data includes free, dirty, and bad block maps, and an Erase Unit Health map on the flash memory, wherein the relocating of Erase Unit related data includes relocating a Master Block of the targeted Master Control Erase Unit, and wherein the Master Block contains file system information;

c) acquiring a semaphore, moving one block corresponding to the Erase Unit related data from the target Master Control Erase Unit to the To-Be-Next Master Control Erase Unit, updating the Erase Unit related data in the Master Control erase Unit so that any updates due to file operations involve changes to the relocated Blocks in the To-Be- Next Master Control Erase Unit, and releasing the semaphore;

d) repeating c) until all Blocks have been relocated;

e) locking the semaphore, updating partition information to change the Master Control Erase Unit form the targeted Master Control Erase Unit from the targeted Master Control Erase Unit to the To-Be-Next Master Control Erase Unit, and releasing the semaphore;

f) erasing the targeted Master Control Erase Unit and updating free, dirty, Erase Unit Health, and bad maps appropriately;

g) identifying a free Erase Unit to act as the To-Be-Next Master Control Erase Unit to mark all Blocks within the To-Be-Next Master Control Erase Unit as used to prevent storing file data in the Blocks of the To-Be-Next Master Control Erase Unit.

h) updating the free map corresponding to the To-Be-Next Master Control Erase Unit to mark all Blocks within the To-Be-Next Master Control Erase Unit as used to prevent storing file data in the Blocks of the To-Be-Next Master Control Erase Unit.

8. The method of claim 7 wherein the reclaiming of the targeted Erase Units comprises:

a) locating files in one of the targeted Erase Units on an Extent basis by use of Erase Unit Information contained in a Master Control Erase Unit;

b) acquiring at least one of a semaphore and a mutex and locking a file containing the file data by setting a variable in an Incore Inode stored in the RAM;

c) moving one file block from the one targeted Erase Unit to a free Erase Unit and determining if a file operation on the file is to be performed by checking a reqFileReadWrite variable in the Incore Inode;

d) if an Inode is present in the one targeted Erase Unit, updating the Incore Inode after relocation of the Inode before releasing a file lock in the Incore Inode;

e) if the variable reqFileReadWrite is set, releasing the file lock to allow the file operation to be performed provided there are sufficient free Blocks available in the flash memory;

f) if the variable reqFileReadWrite is set and if there is insufficient free Blocks on the flash memory, suspending the file operation until the reclamation is finished;

g) if the variable reqFileReadWrite is not set, continuing the relocation of the file blocks on after another until all blocks of the file in the one targeted Erase Unite have been relocated to the free Erase Unit;

h) repeating b) to e) for all files in the one targeted Erase Unit;

i) when all file blocks have been re-located form the one targeted Erase Unit, erasing the one targeted Erase Unit; and, j) after the erasure, locking the at least one of a semaphore and a mutex and updating free, dirty, and bad block map data for the new state of the one targeted Erase Unit.

9. A method of selecting for reclamation an Erase Unit from among a plurality of Erase Units of a flash memory comprising:

inspecting information of a Master Control Erase Unit;
selecting the Erase Unit for reclamation based on the inspected information, wherein an Erase Unit is selected as the Erase Unit to be reclaimed if there are free Erase Units and a number of erasures of the Erase Unit has exceeded a threshold, wherein the threshold is a maximum difference between the number of erasures of the Erase Unit having the most erasures and the number of erasures of the Erase Unit having the least erasures; and
reclaiming the Erase Unit selected for reclamation even though free Erase Units exist on the flash memory sufficient to support a file operation.

10. The method of claim 9 wherein the selecting of the Erase Unit for reclamation comprises selecting a dirtiest one of the Erase Units as the Erase to be reclaimed if the Erase to be reclaimed is more than 75% dirty.

11. The method of claim 9 wherein the selecting of the Erase Unit for reclamation comprises;

selecting a Master Control Erase Unit of the flash memory for reclamation if the Master Control Erase Unit is full;
selecting a dirtiest on of the Erase Units as the Erase Unit to be reclaimed if there are no free Erase Units;
selecting a most worn one of the Erase Units as the Erase to be reclaimed if there are free Erase Units and the most worn Erase has exceeded a threshold of minimum to maximum limit of erasures; and, selecting a dirtiest one of the Erase Units as the Erase to be reclaimed if the Erase to be reclaimed is more than 75% dirty.

* * * * *